May 11, 1926.
F. H. MEYER
VEHICLE WHEEL
Filed Jan. 29, 1924
1,583,986
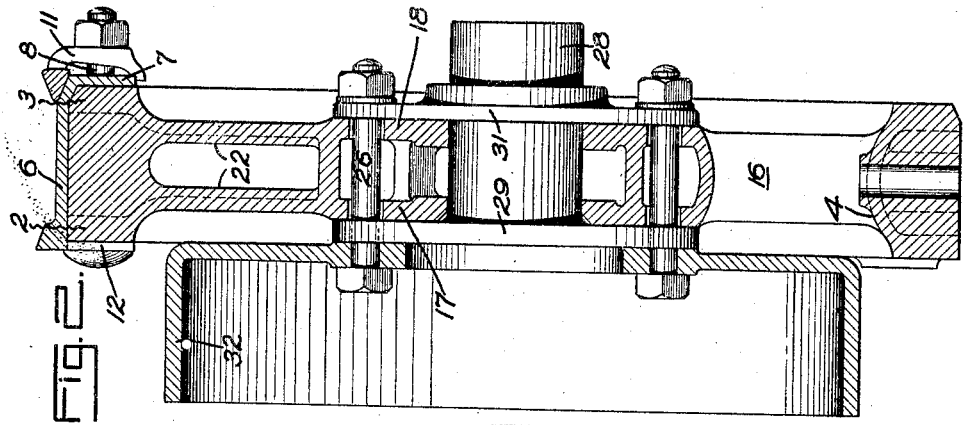
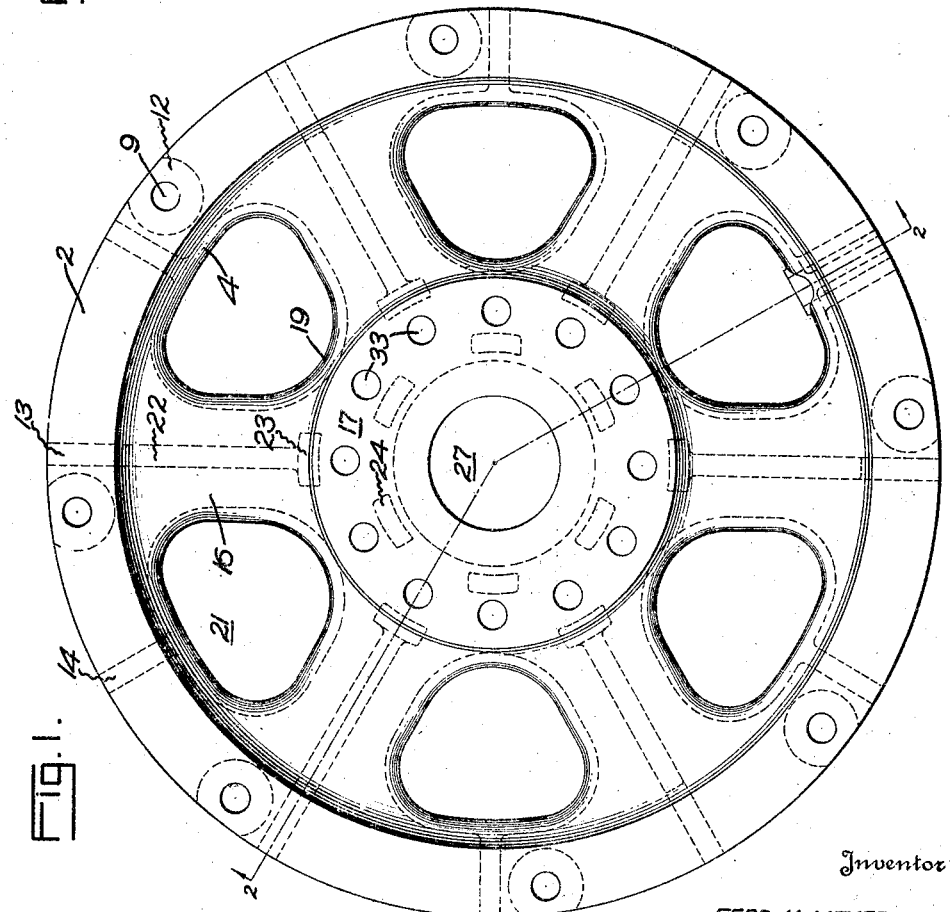
Inventor
FERD H. MEYER.
By White Prost + Evans
WITNESS.
Louis Laventi.
His Attorneys.

Patented May 11, 1926.

1,583,986

UNITED STATES PATENT OFFICE.

FERD H. MEYER, OF OAKLAND, CALIFORNIA.

VEHICLE WHEEL.

Application filed January 29, 1924. Serial No. 689,264.

My invention relates to wheels and particularly to wheels in which the body is made in one piece.

One of the objects of the invention is to produce a light, metal, spoked, wheel.

Another object of the invention is to produce a wheel structure which will radiate the heat generated in the tires.

Another object of the invention is the production of a wheel, the body of which may be made of aluminum, and the felloe band and driving hub portions of steel, without sacrifice of the qualities of strength, durability and lightness.

Another object of the invention is the production of a wheel which may be readily fitted and accommodated to various sizes of hubs without affecting the strength of the wheel.

Other objects of the invention together with the foregoing will be set forth in the following description of the preferred embodiment of means for practicing the same, and which is illustrated in the drawings accompanying and forming part of the specification. It is to be understood that I do not limit myself to the showing made by the said descriptions and drawings, as I may adopt variations of my preferred form within the scope of my invention as set forth in the claims.

Referring to the drawings:

Figure 1 is a side view of the wheel body formed in one integral casting.

Figure 2 is a sectional view of my wheel, the plane of section being indicated by the line 2—2 of Figure 1. The view shows the complete structure with the brake drum as arranged for the rear wheel of a vehicle.

The wheel of my invention comprises a single casting preferably of aluminum or other light metal or alloy, and including a channel-section rim portion 2, formed by the side walls 2 and 3, and an inwardly curving bottom or cross wall 4. The channel opens outwardly in a radial direction and is enclosed, in the finished wheel, by the felloe band 6, which is preferably shrunk into place. The felloe band is formed with a radial flange 7, which seats against the side of the rim portion, and bolts 8 passing thru the apertures 9 in the rim portion and thru the flange 7, hold the tire-rim lugs in place. Bosses 12 are provided on the opposite wall 2 of the rim portion, to seat the head of the bolts 8.

Closely adjacent each bolt 8 is a post 13 or 14 which extends laterally across the hollow rim section to stiffen it, and to take the compression stresses of the bolts 8. The posts 13 are disposed opposite the tubular spokes 16 which connect the rim portion of the wheel body with the hub portion. This is also of channel-section, opening inwardly and formed of the lateral walls 17 and 18, with the cross walls 19 rounding into the tubular spokes, which at their outer ends, round into the cross walls 4.

The posts 14 extend across the rim portion opposite the center of the spaces 21 between the spokes, that is to say, they extend radially outwardly from the middle portion of the walls 4.

Contiguous with the posts 13 are ribs 22. These ribs are disposed in the plane of the axis of the wheel on opposite inside surfaces of the posts, and on each side, round into the posts 13 as shown in Figure 2. At their inner end these ribs round into posts 23 which are disposed across the hollow hub section at the inner end of each spoke.

Posts 24 are also disposed laterally across the hollow hub section in a circle concentric with the axis of the wheel and with the posts 23. These two series of concentric posts are designed to carry the compression stresses of the bolts 26 disposed between them, and which secure to the wheel body the hub and the driving flanges.

The center of the wheel body is provided with an aperture 27 which may be bored out to any desired size to permit the wheel to be mounted on various sizes of hubs, and it is to be noted that the design of the wheel permits a wide variation in the size of this central aperture without affecting the strength of the wheel.

Fitted in this aperture is a hub sleeve 28, in which the driving axle is secured by well known means. Integral with the hub sleeve is a flange 29 adapted to lie contiguous with the outer face of the hub portion wall 17. Lying contiguous with the opposite hub portion wall 18, is the loose flange 31, apertured to encircle the sleeve 28. These flanges 29 and 31 are suitably drilled with bolt holes for the bolts 26 and the hub portion of the wheel is also correspondingly drilled altho it is to be noted that the holes in the hub portion are of larger diameter than the bolts, so that the bolts do not make contact with the walls of the hub portion, the driving effect of the flanges 29 and 31 being secured solely by their frictional engagement with the sides of the hub portion due to the clamping bolts 26 which hold them thereon. This structure and method of connection is made necessary by the soft character of the wheel body which will not hold a key, or similar connection.

A brake drum 32 is held in the wheel assembly by the same bolt 26 as shown in Figure 2.

It is to be noted that the spacing of the compression posts 23 and 24 provide an annular area through which the apertures 33 for the bolts 26 may be drilled and that various spacings of these apertures 33 may be had as circumstances may make desirable, without getting too far away from a supporting post or from one of the cross walls 19, which of course are also adapted to function in the same way as the posts in carrying the compression stresses of the bolts.

While I have shown in the drawings and described a wheel particularly adapted for the rear or driving wheel of a vehicle, it will be understood that the wheel body as shown in Figure 1 is the same for either the front or rear wheels and that for the front wheels suitable hub sleeves and flanges may be substituted for those shown in Figure 2, the method of attachment being the same.

Because of the hollow construction of my wheel I am enabled to make an extremely light wheel. A wheel of the character shown in Figure 1, eighteen and one-quarter inches in diameter, weighs but twenty pounds and while it tests safe up to seventeen tons, it is designed to carry a maximum load of twenty-five hundred pounds and a skid reaction up to sixty percent of that amount.

It will also be observed that the construction readily facilitates the radiation of heat from the tires and that the brakes of the vehicle may easily be reached for adjustment through the spokes.

Shrinkage stresses are factors which cannot be ignored in the designing of a wheel of this character, and it will be observed that the configuration and arrangement of the various portions of the wheel is such as to reduce these stresses to a minimum, while at the same time providing the maximum amount of strength against radial and lateral stresses of operation.

I claim:

1. A one-piece wheel body comprising a channel-section rim portion opening outwardly, a channel-section hub portion opening inwardly, tubular spokes integrally connecting the rim and hub portions, and ribs disposed in the plane of the axis of the wheel on the inside of the tubular spokes.

2. A one-piece wheel body comprising a hollow rim portion adapted to mount a felloe band and bolt-held tire-rim lugs, a hollow hub portion adapted to mount a bolt-held driving flange on each lateral side thereof, and integral posts disposed laterally across the hollow hub and rim portions to carry the compressive stresses of the fastening bolts of the tire-rim lugs and driving flanges.

3. In a wheel, a one-piece body comprising a hollow hub portion, driving flanges between which the hub portion is secured, a series of bolts for clamping the flanges to the hub portion disposed about the flanges, and a series of posts disposed laterally across the hub portion on each side of the line of bolts to carry the compressive stresses of the bolts.

4. A one-piece wheel body comprising a channel-section rim portion opening outwardly, a channel-section hub portion opening inwardly, tubular spokes connecting the rim and hub portions, a pair of oppositely disposed ribs arranged in the plane of the wheel axis on the inside of each tubular spoke, and compression posts disposed laterally across the rim portion and the hub portion at the outer and inner ends of each pair of said ribs and continuous therewith.

5. A wheel comprising a one-piece wheel body formed with a channel-section rim portion opening outwardly, a channel-section hub portion opening inwardly, tubular spokes connecting the rib and hub portions, ribs disposed in the plane of the wheel axis on the inside of the spokes, a separate felloe band enclosing the rim portion, separate driving flanges between which the hub portion lies, a series of tire-rim lug bolts passing thru the rim portion, a compression post disposed laterally across the hollow rim portion adjacent each of said lug bolts, a series of bolts for clamping the driving flanges to the hub portion and extending therethru, and a series of posts disposed laterally across the hub portion on each side of the line of clamping bolts.

6. In a wheel, a one-piece wheel body including a hollow hub portion having a central aperture therethrough, a hub sleeve disposed in said aperture and having an integral flange contiguous with one face of the hub portion, a loose flange encircling said hub sleeve and contiguous with the opposite face of the hub portion, bolts passing thru said hub portion and both flanges to clamp the flanges against the hub portion, and a series of posts disposed laterally across the hub portion on each side of the line of clamping bolts.

7. A one-piece wheel body comprising rim and hub portions, spokes integrally connecting said portions, and a plurality of posts disposed laterally across said hub portion to carry the compressive stresses on the wheel body.

8. A one-piece wheel body comprising rim and hub portions, tubular spokes integrally connecting said portions, reinforcing ribs within said spokes to stiffen the wheel body, and posts disposed laterally across said hub portion to carry the compressive stresses on the body.

In testimony whereof, I have hereunto set my hand.

FERD H. MEYER.